Patented Apr. 30, 1946

2,399,330

UNITED STATES PATENT OFFICE 2,399,330

PLASTICIZED COMPOSITIONS

George F. Deebel, Dayton, Ohio, assignor to Monsanto Chemical Company, a corporation of Delaware No Drawing. Application December 12, 1942, Serial No. 468,818

3 Claims. (Cl. 260—36)

The present invention relates to a composition of matter having wide utility as a plasticizing and softening agent for plastic compositions and synthetic resins. It relates particularly to plastic or resinous materials containing 1,4-diphenoxybutene-2 which is described in Ber. vol. 55, page 3538 (1922).

It is an object of the invention to provide organic plastic compositions of especial value for use in the arts. It is a further object to provide improved plastic compositions containing synthetic resins, particularly those produced by condensation of aldehydes with partially hydrolyzed polymerization products of vinyl esters. The plastic compositions are characterized not only by a high degree of flexibility, but also improved stability to heat and daylight.

According to the present invention there is employed 1,4-diphenoxybutene-2 as a plasticizing agent. Due to its excellent solvent power or miscibility with the components of the plastic compositions or lacquers with which it is used, the plasticizing effect of 1,4-diphenoxybutene-2 is extremely high. This compound is compatible with, for example, cellulose esters, cellulose ethers and the polyvinyl resins such as polystyrene, polyvinyl butyral, polyvinyl acetate, etc., the inclusion of 1,4-diphenoxybutene-2 in such plastic compositions and synthetic resins imparting great flexibility to such products. In particular this compound is distinguished by low vapor pressure and therefore yields artificial compositions very stable to aging, which compositions undergo substantially no loss in weight upon storage even at elevated temperatures. Artificial compositions which have been plasticized by 1,4-diphenoxybutene-2 are to a great extent stable to cold and retain their extensibility and their good mechanical properties even at comparatively low temperatures. 1,4-diphenoxybutene-2 is odorless and practically tasteless; it does not promote heat disintegration; and it causes no discoloration during exposure to sunlight.

The invention is illustrated, but not limited, by the following examples:

*Example 1*

An 8% solution of polystyrene in a mixture consisting of equal parts of benzene and xylene was prepared and there was then added to this solution an amount of 1,4-diphenoxybutene-2 equal to 25% by weight of the polystyrene employed. Films cast from this solution were clear, hard and elastic. Heating for one hour at a temperature of 300° C. showed only a trace of yellowing, which yellowing, however, is not as marked as that obtained by submitting pure polystyrene to the same conditions. When exposed to the rays of a General Electric sun-lamp for 24 hours there is only slight yellowing and no checking.

*Example 2*

An 8% solution of Butvar in a mixture consisting of 80% by weight of dioxan and 20% by weight of ethyl alcohol was prepared and there was then added to this solution an amount of 1,4-diphenoxybutene-2 equal to 25% by weight of the Butvar employed. Films cast from this solution were clear, transparent, brilliant and possessed a remarkable degree of flexibility and toughness. The films were not substantially discolored by prolonged exposure to daylight. When heated for one hour at a temperature of 300° C., the films showed only a trace of yellowing; but their flexibility and toughness were not disadvantageously affected.

Tests in which the 1,4-diphenoxybutene-2 was employed in an amount equal to 50% of the Butvar present in the dioxan ethyl alcohol mixture also gave films which possessed the desirable properties described above.

*Example 3*

An 8% solution of Formvar in a mixture consisting of 80% by weight of dioxan and 20% by weight of ethyl alcohol was prepared and there was then added to this solution an amount of 1,4-diphenoxybutene-2 equal to 50% by weight of the Formvar employed. Films cast from this solution were clear, hard and elastic and showed good resistance to heat and daylight.

"Butvar" is the name of a resinous material produced by condensing butyraldehyde with a partially hydrolyzed polyvinyl acetate. The commercial product may contain approximately 19% of OH, 1% acetate and 80% of butyraldehyde groups.

"Formvar" is a material of similar properties produced by condensing formaldehyde with a similar partially hydrolyzed polyvinyl acetate. It may contain 14% polyvinyl acetate, 5% polyvinyl alcohol and 81% formal groups.

1,4-diphenoxybutene-2 is likewise applicable as a plasticizing agent for such varied synthetic resins as those derived from vinyl esters, vinyl ethers, other vinyl resins, natural and synthetic resins such as the polybasic acid—polyhydric alcohol resins, phenol-formaldehyde resins, shellac and the like. The 1,4-diphenoxybutene-2 may be used alone or in admixture with other plasticizers in the formulation of coating and plastic compositions.

The amount of the 1,4-diphenoxybutene-2 employed for plasticizing purposes will vary from 1 or 2% by weight to as much as 25% to 50%—based upon the weight of the plasticized composition. The amount used will depend largely upon the properties desired.

What I claim is:

1. A polyvinyl acetal plastic composition containing 1,4-diphenoxybutene-2.

2. A plastic product comprising a polyvinyl butyral resin and 1,4-diphenoxybutene-2 as a plasticizer.

3. A plastic product comprising a polyvinyl formal resin and 1,4-diphenoxybutene-2 as a plasticizer.

GEORGE F. DEEBEL.